United States Patent [19]

Lesca et al.

[11] Patent Number: 5,286,552
[45] Date of Patent: Feb. 15, 1994

[54] PROCESS FOR THE PRODUCTION OF PROPYLENE POLYMER FILMS AND LAMINATES AND PRODUCTS THUS OBTAINED

[75] Inventors: Giuseppe Lesca; Vincenzo Giannella, both of Milan; Serafino Ongari, Rho; Annibale Vezzoli, Carugo, all of Italy

[73] Assignee: Himont Incorporated, Wilmington, Del.

[21] Appl. No.: 660,502

[22] Filed: Feb. 25, 1991

[30] Foreign Application Priority Data

Feb. 28, 1990 [IT] Italy ............................ 19511 A/90

[51] Int. Cl.$^5$ ..................... C08L 23/16; C08L 53/00
[52] U.S. Cl. ................................. 428/220; 525/240; 525/322; 525/323
[58] Field of Search .................. 525/240, 322, 323; 428/220

[56] References Cited

FOREIGN PATENT DOCUMENTS

| | | |
|---|---|---|
| 0077532 | 4/1983 | European Pat. Off. . |
| 086300 | 8/1983 | European Pat. Off. . |
| 145368 | 6/1984 | European Pat. Off. . |
| 0170255 | 2/1986 | European Pat. Off. . |

OTHER PUBLICATIONS

JP 59-149910 (Abstract only).
JP 59-149909 (Abstract only).
JP 55-118910 (Abstract only).

*Primary Examiner*—Carman J. Seccuro, Jr.

[57] ABSTRACT

Disclosed are films and laminates which are prepared by known filming or calendering processes using heterophasic propylene polymer compositions comprising:

A) 10–60 parts by weight of homopolymer polypropylene having an isotactic index greater than 90, or crystalline copolymer of propylene with ethylene and/or other alphaolefins containing more than 85% by weight of propylene and having an isotactic index greater than 85;

B) 10–40 parts by weight of a semi-crystalline essentially linear copolymer containing prevailingly ethylene, which is insoluble in xylene at room temperature;

C) 30–60 parts by weight of an amorphous ethylene-propylene copolymer, soluble in xylene at room temperature and containing 40–70% by weight of ethylene;

said propylene polymer compositions having a ratio between the intrinsic viscosities, in tetrahydronaphthalene at 135° C., of the portion soluble in xylene and of the portion insoluble in xylene at room temperature of from 0.8 to 1.2.

7 Claims, No Drawings

PROCESS FOR THE PRODUCTION OF PROPYLENE POLYMER FILMS AND LAMINATES AND PRODUCTS THUS OBTAINED

It is known that the propylene homopolymers and copolymers can easily be filmed and calendered, thus obtaining films and laminates having excellent mechanical properties, particularly good rigidity and considerable chemical inertia.

However, said products have the disadvantage of having poor impact resistance, particularly at low temperatures. In order to overcome this disadvantage, it has been suggested to mix polyethylene with propylene polymers, as disclosed, for instance, in British patent No. 1,139,889, which teaches the use of a polypropylene/LDPE (low density polyethylene) mixtures in order to obtain films having improved impact resistance.

Now there is a need for polypropylene films and laminates which, in addition to having good impact resistance also have good elastic properties and softness. Presently products made up of heterophasic mixtures of propylene crystalline polymers and elastomeric olefin copolymers obtained by sequential stereospecific polymerization are establishing themselves in the polypropylene industry. These products possess a satisfying compromise of elastic properties and mechanical resistance and can easily be transformed into manufactured articles by using the apparata and processes normally used for thermoplastic materials. However, when said heterophasic compositions undergo filming or calendering, one experiences many difficulties, due mainly to the formation of fisheyes, tearing of the films and laminates during processing, or the formation of rough surfaces.

All of these drawbacks cause difficulties during the manufacturing process and often prevent the obtainment of products having a practical interest.

It has now been found by Applicants that polypropylene films and laminates having elastic properties and good softness can easily be prepared by filming or calendering heterophasic propylene polymer compositions comprising:

A) 10-60 parts by weight, preferably 20-50 parts by weight, of homopolymer polypropylene having an isotactic index greater than 90, preferably from 95 to 98, or of a crystalline copolymer of propylene with ethylene and/or other alpha olefins, such as butene or 4-methyl-1-pentene, containing more than 85% by weight of propylene and having an isotactic index greater than 85;

B) 10-40 parts by weight of a semi-crystalline essentially linear copolymer containing prevailingly ethylene, which is insoluble in xylene at room temperature;

C) 30-60 parts by weight, preferably 30-50 parts by weight, of an amorphous ethylene- propylene copolymer, optionally containing minor proportions, preferably from 1 to 10% by weight, of a diene, which is soluble in xylene at room temperature and contains from 40 to 70% by weight of ethylene;

said propylene polymer compositions having a ratio between the intrinsic viscosities in tetrahydronaphthalene at 135° C. of the portion soluble in xylene and of the portion insoluble in xylene at room temperature of from 0.8 to 1.2.

The processes which can conveniently be used for the filming and calendering are those known in the art.

Calendering is preferably used to produce sheets and foils (i.e. laminates having a thickness of at least 100 μm), while for the production of films (i.e. laminates having a thickness smaller than 100 μm) it is preferable to use the extrusion-blowing, extrusion-casting or extrusion-biorented stretching.

The heterophasic polymer compositions used in the process of the present invention are prepared through sequential polymerization in two or more stages, using highly stereospecific Ziegler-Natta catalysts. Component (A) forms during the first stage of polymerization, preferably in liquid monomer, while components (B) and (C) form during the subsequent polymerization stages in the presence of component (A) formed in the first stage.

In particular it is possible to use catalysts comprising the product of the reaction of a solid component containing a titanium compound having at least an halogen atom bonded to the Ti and an electron-donor compound (inside donor) supported on magnesium chloride, with an Al-trialkyl compound and an electron-donor (outside donor). The preferred titanium compound used is $TiCl_4$. The inside donor is preferably selected from the group consisting of alkyl, cycloalkyl and aryl phthalates, such as for instance diisobutyl, di-n-butyl- and di-n-octyl phtha late.

The outside donor is preferably selected from silicon compounds containing one of more -OR groups, where R is a hydrocarbon radical. Specific examples are di-phenyldimethoxysilane, dicyclohexyl dimethoxysilane, methyltert-butyl dimethoxysilane, diisopropyl dimethoxysilane and phenyltriethoxysilane. Examples of catalysts and polymerization processes suitable for preparing the above mentioned heterophasic polypropylene compositions are described in U.S. patent application Ser. No. 07/515,936, filed Apr. 27, 1990, abandoned.

In order to obtain films and laminates free of fisheyes and having satisfactory elastic and mechanical properties, as mentioned above, in the heterophasic compositions used, the ratio between the intrinsic viscosity, in tetrahydronaphthalene at 135° C., of the portion soluble in xylene and of the portion insoluble in xylene at room temperature, (hereinafter indicated as "viscosity ratio") should be maintained, within a narrow range of from 0.8 to 1.2, including 0.8 and 1, and preferably at about 1.

Within said range it is also possible to operate at high filming or calendering speed and avoid inconveniences such as adhesion of the sheet to the rollers.

Moreover, the presence of fraction (B) in an amount of at least 10 parts by weight allows the obtainment of films and laminates which do not whiten when bent.

Heterophasic compositions having viscosity ratios higher than 1.2 could be used in the case of cast or blow coextrusion, as long they represent the noncarrying layers of the composite film which is obtained from the said coextrusion processes.

The process of the present invention is characterized by a wide flexibility, in that it is possible to modify the formulation of the heterophasic composition which is used, for the purpose of modifying the physical and chemical properties of the finished product.

In particular it is possible to:
  add inorganic and organic fillers, even in very high amounts;
  add plasticizers and extenders, such as mineral oils and natural oils;
  add compounds which confer self-extinguishing properties to the products.

The films and laminates obtained by the process according to the present invention and which constitute a further object of the present invention, possess valuable properties which render them appropriate for applications from which the olefin polymers have been excluded up to now, or for which up to date they have not given performances that were completely satisfactory.

In particular, the films or laminates of the present invention have the following properties:

1) Relatively low flexural modulus, which makes them soft and resilient. The value of the modulus is, moreover, not very sensitive to temperatures, as compared to, for instance, PVC. based compositions. Therefore, the temperature range in which they can be conveniently used is very broad, from −60° to 120° C.

2) Silky to the touch, which is particularly pleasant.

3) High oxygen and steam permeability.

4) High impact resistance even at temperatures much lower than 0° C.

5) Can be sterilized at 120° C.

6) Can be thermowelded to each other, to polyethylene or to polypropylene at a temperature from 135° to 150° C. It is also possible, by mixing the above mentioned heterophasic compositions with LDPE or LLDPE in a wide range, typically from 20 to 40%, to lower the thermowelding temperature to about 100° C., while still maintaining good mechanical properties.

Finally, the films and laminates of the present invention can undergo a series of subsequent operations, such as:

surface embossing, by heating the surface to about 150° C. and compressing it against the embossing roller;

printing, after having made the surface ink sensitive through oxidating (for instance flame) or ionizing treatments (for instance corona discharge treatment);

coupling with fabric or film, particularly polypropylene, by heating of the surfaces at 150°–160° C. and compression;

coextrusion with other polymeric or metallic materials (e.g. aluminum film);

plating treatments (depositing a layer of aluminum through evaporation under vacuum, for example);

application of an adhesive layer on one of the two faces of the film, thus producing an adhesive film;

thermoforming and production of blisters;

drawing of metal-polymer composite laminates.

These subsequent treatments may be applied either on line, immediately after the manufacture of the film or laminate, or at a subsequent time.

The following examples are given in order to illustrate and not limit the present invention.

EXAMPLE 1

The production of film was carried out in an industrial apparatus for the production of film by cast technology, starting from two materials made up of heterophasic propylene compositions, whose characteristics are as follows:

|  | Composition A | Composition B* |
|---|---|---|
| M.I. of the total composition g/10 min (230° C.; 2.16 kg) | 0.8 | 0.5 |
| total % $C_2$ | 41 | 46 |
| % of polymer soluble in xylene at 23° C. | 41.9 | 46.3 |
| I.V. of the fraction soluble | 2.78 | 3.56 |

-continued

|  | Composition A | Composition B* |
|---|---|---|
| in xylene dl/g |  |  |
| % of polymer insoluble in xylene at 23° C. | 58.1 | 53.8 |
| I.V. of the fraction insoluble in xylene, dl/g | 2.64 | 2.79 |
| viscosity ratio | 1.05 | 1.28 |

*comparison
M.I. = melt index
I.V. = intrinsic viscosity in tetrahydronaphthalene at 135° C.

The apparatus was an extruder with a 60 mm diameter and a length/diameter ratio (L/D)=35, a flat die 1150 mm long and a distance between edges of 0.8 mm. The extruder temperature profile is between 180° and 290° C., while the flanges, filter, neck and die are maintained at 300° C.

Using composition A, the operating conditions "1" indicated below were reached and it was possible to improve said conditions until conditions "2" were achieved, while using composition B it was impossible to reach conditions better than "3".

|  | Conditions | | |
|---|---|---|---|
|  | 1 | 2 | 3 |
| Polymer | A | A | B |
| Die pressure, bar | 160 | 220 | 220 |
| Energy absorption*, A | 45 | 57 | 50 |
| Linear velocity, m/min | 21 | 50 | 8 |
| Minimum thickness of film obtained, μm | ≦12 | ≦12 | 45 |
| Film appearance | homogeneous | homogeneous | presence of fisheyes |

*energy supplied to the screw of the extruder.

EXAMPLE 2 (COMPARATIVE)

By way of comparison, a heterophasic polypropylene composition C, which has a higher melt flow than compositions A and B of Example 1, was fed in an industrial apparatus for cast coextrusion equipped with three extruders, having a maximum film width of 1700 mm, and a maximum film winding capacity of 300 m/min.

The main structural characteristics of the composition C are:

| M.I. of the total composition, g/10 min (230° C.; 2.16 kg) | 7.1 |
|---|---|
| % total $C_2$ | 41.8 |
| % polymer soluble in xylene at 23° C. | 41.7 |
| I.V. of fraction soluble in xylene, dl/g | 2.1 |
| % polymer insoluble in xylene at 23° C. | 58.3 |
| I.V. of fraction insoluble in xylene, dl/g | 1.55 |
| viscosity ratio | 1.35 |

The extrusion temperature at the die was 240° C. The minimum thickness of the film which was produced with regularity was 40 μm and contained fisheyes. Below this thickness non-homogeneity started to develop to the point that it produced lacerations in the film.

By using the coextrusion capability of the apparatus, a triple layer film was produced with a total thickness of 25 μm, where the two outside layers, each 4 μm thick, were made up of composition C, and the inside layer, 17 μm thick, was low density polyethylene, with a M.I. (190° C.; 2.16 kg) of 2 g/10 min. The triple layer film thus obtained presented an optimum homogeneity.

Moreover, a winding velocity of 200 m/min was rapidly reached.

EXAMPLE 3

A DOLCI blow-extrusion pilot scale apparatus was used, which had the following characteristics:
extruder diameter=45 mm;
L/D=22;
ring die 50 mm in diameter, with a distance between edges of 0.5 mm.

The heterophasic polypropylene compositions which follow, indicated by D, E, and F, were fed in succession in pelletized form:

| Composition | D | E* | F* |
|---|---|---|---|
| M.I. (230° C.; 2.16 Kg), g/10 min | 0.8 | 6.5 | 15 |
| Total % of ethylene | 44 | 45 | 43 |
| % of soluble in xylene at 23° C. | 46.2 | 40.6 | 41.8 |
| I.V. of soluble in xylene, dl/g | 2.55 | 2.51 | 1.87 |
| % of insoluble in xylene at 23° C. | 53.8 | 59.0 | 57.2 |
| I.V. of insoluble in xylene, dl/g | 2.33 | 1.78 | 1.36 |
| viscosity ratio | 1.09 | 1.41 | 1.38 |

| The blow-extrusion process conditions were: | |
|---|---|
| Temperature of the screw: | 190° C.–220° C. |
| Temperature of the die: | 200° C.–190° C. |
| Screw velocity: | 20 rpm |
| Capacity, in kg/h: | 5.0 (composition D); 6.2 (composition E); 5.6 (composition F). |

*comparison

The following characteristics were observed:
The minimum thickness at which composition F can be blown is 150 μm. At thicknesses lower than this there are holes, lack of homogeinity, and, subsequently, collapsing of the bubble. The lack of homogeneity is also evident at great thickness where the surface of the film has an "orange peel" appearance. The film feels like paper.
The minimum at which composition E can be blown is 20 μm. The operation is more regular and constant than in the case of composition F. The "hand" of the film, although better than in the case of composition F, is still somewhat paper-like and the surface presents irregularities.
The minimum thickness at which composition D can be blown is 10 μm. This is the minimum thickness which can be produced by the apparatus used. The material is homegeneous even at thicknesses lower than 10 μm (this is demonstrated by stretching 200–300% the 10 μm film by hand).

The operation is very regular and constant; the film feels silky and pleasant.

EXAMPLE 4

The stretchability of some films has been evaluated using the laboratory TM LONG film stretcher, starting from pieces of film measuring 5×5 cm and 570 μm thick, heated at adequate temperatures and stretched contemporaneously in two orthogonal directions, in order to obtain a final thickness of 20 μm.

Under these conditions the stretch ratio is 1:6:6. The heterophasic propylene polymer compositions used are referred to below as G, H, and I:

| Composition | G | H* | I* |
|---|---|---|---|
| M.I. (230° C.; 2.16 Kg), g/10 min | 0.95 | 6.3 | 10 |
| Total % of ethylene | 42.3 | 41.8 | 42.2 |
| % of soluble in xylene at 23° C. | 45.3 | 43.9 | 44.1 |
| I.V. of soluble in xylene, dl/g | 2.9 | 2.36 | 2.24 |
| % of insoluble in xylene at 23° C. | 54.7 | 56.0 | 55.9 |
| I.V. soluble in xylene, dl/g | 2.4 | 1.88 | 1.59 |
| viscosity ratio | 1.2 | 1.26 | 1.40 |

*comparison

The stretch conditions were the following:

| Composition | G | | H | | I | |
|---|---|---|---|---|---|---|
| Stretch temperature, °C. | 150 | 135 | 150 | 130 | 150 | 130 |
| Preheating time, sec. | 30 | 30 | 15 | 15 | 15 | 30 |
| Stretch pressure, bar | 30 | 30 | 20 | 20 | 20 | 20 |
| Max. stretch velocity, inch/sec | 3 | 3 | 2 | 0.8 | 0.6 | 0.6 |

The maximum stretch velocity is the point at which laceration and breaking of the film occur.

A velocity of 3 inch/sec., corresponds to 9000%/min., which represents the industrial conditions of biaxially oriented polypropylene film production.

One can see that only composition G reaches these conditions, while the other two are lower.

EXAMPLE 5

The calendering capability of some polymeric materials is evaluated with a laboratory open mixer having two counterrotating rollers.

Composition A of Example 1 (M.I.=0.8; viscosity ratio =1.05) and composition C. of Example 2 (M.I.=7.1; viscosity ratio=1.35) have been evaluated.

Composition A performs perfectly at a temperature from 175° to 185° C. The sheet which is obtained at this temperature is homogeneous and stable up to 30 minutes, it does not degrade, nor is it sticky, and can be stretched very thin, even up to 10 μm.

Composition C, at a temperature from 175° to 185° C., immediately sticks to the rollers. If the temperature is reduced to 165° C. it does not stick to the rollers, but the material obviously lacks homogeneity, since the crystalline fraction does not melt. If the polymer is heated while being processed on the rollers, there comes a point at which the sheet goes from opaque to transparent (melting of the crystalline fraction), but it immediately sticks to the rollers.

Composition A has also been processed through an industrial calender thus forming sheets of a thickness which can be regulated between 0.15 and 1.5 mm, embossed on line at the exit of the calender, with a design imitating natural leather. Synthetic leathers obtained in this manner showed an optimum "hand" and flexibility, and good mechanical characteristics at a wide range of temperatures from −60° to 120° C.

Other features, advantages and embodiments of the invention disclosed herein will be readily apparent to those exercising ordinary skill after reading the foregoing disclosure. In this regard, while specific embodiments of the invention have been described in considerable detail variations and modifications of these embodiments can be effected without departing from the spirit and scope of the invention as described and claimed.

We claim:

1. A process for the production of a propylene polymer film comprising forming a film from a heterophasic propylene polymer composition obtained by sequential polymerization in at least two stages wherein components (B) and (C) are polymerized in the presence of component (A) polymerized in the first stage comprising:
- (A) 10–60 parts by weight of homopolymer polypropylene having an isotactic index greater than 90, or of a crystalline copolymer of propylene with ethylene, other alpha-olefins or combinations thereof, containing more than 85% by weight of propylene and having an isotactic index greater than 85;
- (B) 10–40 parts by weight of a semi-crystalline, essentially linear ethylene-propylene copolymer containing prevailingly ethylene, which is insoluble in xylene at room temperature;
- (C) 30–60 parts by weight of an amorphous ethylene-propylene copolymer, which is soluble in xylene at room temperature and contains 40–70% by weight of ethylene;

said propylene polymer composition having a ratio between the intrinsic viscosities, in tetrahydronaphthalene at 135° C., of the portion soluble in xylene and of the portion insoluble in xylene at room temperature of from 0.8 to 1.2, and containing great than 40% by weight of component (C).

2. The process of to claim 1, wherein component (A) is a crystalline copolymer of propylene with butene or 4-methyl-1-pentene.

3. The process of claim 1, wherein component (C) further contains minor amounts of a diene.

4. A thermoweldable film, having high elastomeric properties comprising a heterophasic propylene polymer composition obtained by sequential polymerization in at least two stages wherein components (B) and (C) are polymerized in the presence of component (A) polymerized in the first stage which is comprised of:
- (A) 10–60 parts by weight of homopolymer polypropylene having an isotactic index greater than 90, or of a crystalline copolymer of propylene with ethylene, other alpha-olefins or combinations thereof, containing more than 85% by weight of propylene and having an isotactic index greater than 85;
- (B) 10–40 parts by weight of a semi-crystalline, essentially linear ethylene-propylene copolymer containing prevailingly ethylene, which is insoluble in xylene at room temperature;
- (C) 30–60 parts by weight of an amorphous ethylene-propylene copolymer, which is soluble in xylene at room temperature and contains 40–70% by weight of ethylene;

wherein said propylene polymer composition having a ratio between the intrinsic viscosities, in tetrahydronaphthalene at 135° C., of the portion soluble in xylene and of the portion insoluble in xylene at room temperature of from 0.8 to 1.2, and containing greater than 40% by weight of component (C).

5. The film of claim 4, wherein component (A) is a crystalline copolymer of propylene with butene or 4-methyl-1-pentene.

6. The film of claim 4, wherein component (C) further contains minor amounts of a diene.

7. The film of claim 4, having a thickness smaller than 100 μm.

* * * * *